(12) United States Patent
Amesöder et al.

(10) Patent No.: US 8,349,049 B2
(45) Date of Patent: Jan. 8, 2013

(54) COMPACT FILTER ELEMENT

(75) Inventors: Dieter Amesöder, Bietigheim-Bissingen (DE); Thomas Sieber, Marklkofen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 388 days.

(21) Appl. No.: 12/599,590

(22) PCT Filed: May 9, 2008

(86) PCT No.: PCT/EP2008/055733
§ 371 (c)(1),
(2), (4) Date: Apr. 21, 2010

(87) PCT Pub. No.: WO2008/138879
PCT Pub. Date: Nov. 20, 2008

(65) Prior Publication Data
US 2011/0099961 A1 May 5, 2011

(30) Foreign Application Priority Data
May 11, 2007 (DE) .................... 20 2007 006 962 U

(51) Int. Cl.
*B01D 46/00* (2006.01)
(52) U.S. Cl. .............................. 55/502; 55/503; 210/450
(58) Field of Classification Search .................... 55/502, 55/503, DIG. 31; 210/450
See application file for complete search history.

(56) References Cited

U.S. PATENT DOCUMENTS

| | | | |
|---|---|---|---|
| 6,045,598 A * | 4/2000 | Fath et al. ...................... 55/490 |
| 6,555,000 B2 | 4/2003 | Knight | |
| 7,094,343 B2 | 8/2006 | Moessinger et al. | |
| 7,341,613 B2 * | 3/2008 | Kirsch ............................. 55/495 |
| 7,396,376 B2 * | 7/2008 | Schrage et al. ................. 55/498 |
| 7,396,377 B2 * | 7/2008 | Lampert et al. ................. 55/502 |
| 7,670,402 B2 * | 3/2010 | Miller ............................. 55/502 |
| 7,695,539 B2 | 4/2010 | Waibel | |
| 8,152,876 B2 * | 4/2012 | Gillenberg et al. ............. 55/337 |
| 2005/0229563 A1 * | 10/2005 | Holzmann et al. .............. 55/502 |

FOREIGN PATENT DOCUMENTS

DE 19638791 3/1988

(Continued)

OTHER PUBLICATIONS

German patent office search report of DE 20 2007 006 962.6, dated Apr. 27, 2009.

(Continued)

*Primary Examiner* — Robert Clemente
(74) *Attorney, Agent, or Firm* — James Hasselbeck

(57) ABSTRACT

The invention relates to a compact filter element (1) for exchangeable use in a filter housing (2). The compact filter element (1) has a filter body (3) with a longitudinal axis (7) and at least one seal (4) arranged in the area of a front end (5) of the filter body (3), the seal having a seal section (8) which is arranged across the width (10) of a housing wall (6), sealing same. The seal section (8) projects beyond a front surface (12) of the filter body (3) in the direction of the longitudinal axis (7). The seal section (8) has a peripheral support wall (9) and at least one seal lip (17) integrally bonded to the outside of the support wall (9), across the width (10) of the latter, wherein the support wall (9) and the seal lip (17) consist of a rubber elastic material.

8 Claims, 1 Drawing Sheet

FOREIGN PATENT DOCUMENTS

| | | |
|---|---|---|
| DE | 8805049 | 6/1988 |
| DE | 3908828 | 9/1990 |
| DE | 4322226 A1 | 1/1995 |
| DE | 19638791 | 3/1998 |
| DE | 3908828 | 9/1999 |
| DE | 102004049403 | 4/2006 |
| EP | 1457247 | 9/2004 |
| WO | WO0050149 A1 | 8/2000 |
| WO | WO2007003159 A2 | 1/2007 |

OTHER PUBLICATIONS

German patent office search report of DE 20 2007 006 962.6; International search report PCT/EP2008/055733, dated Apr. 27, 2009.

* cited by examiner

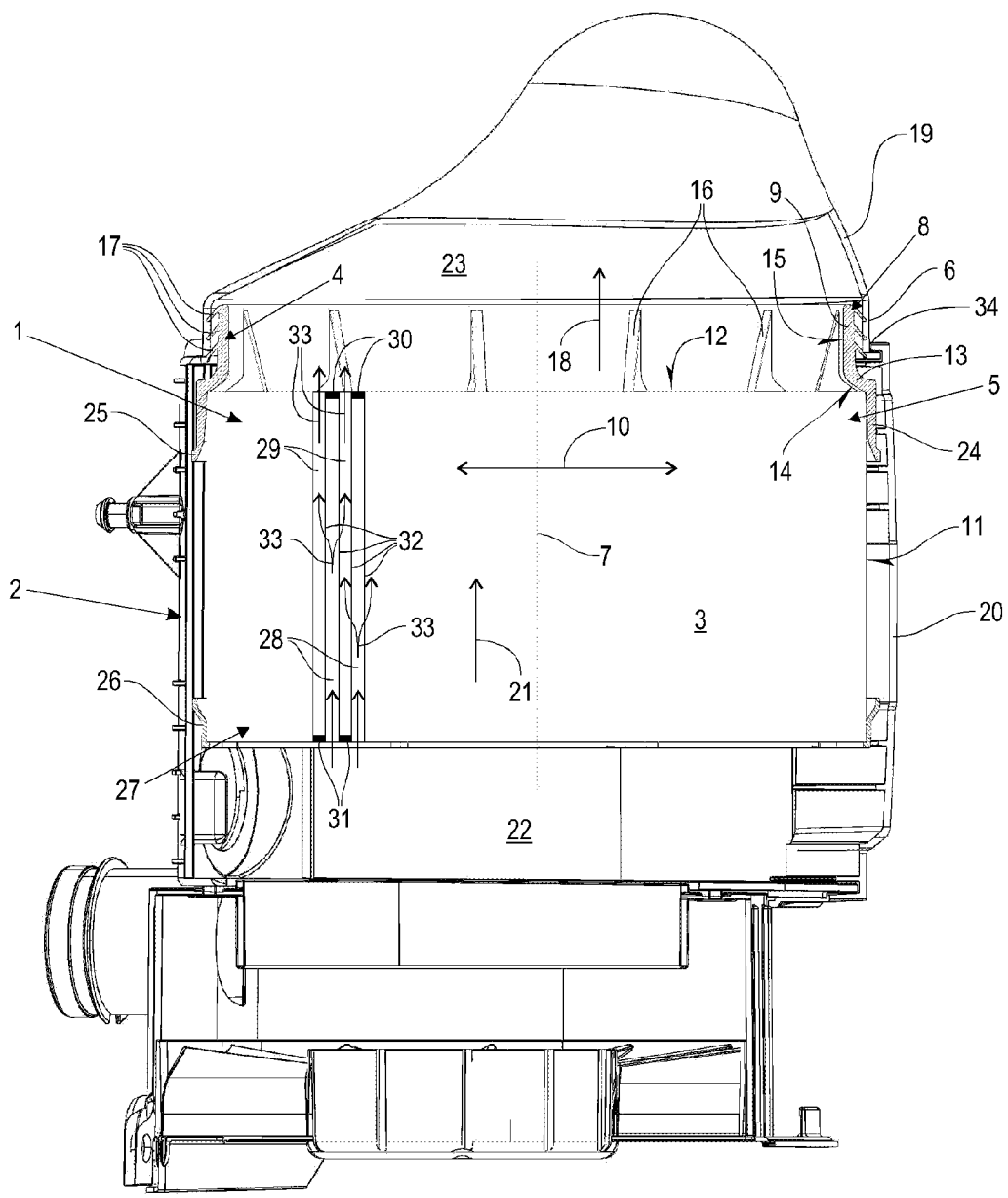

COMPACT FILTER ELEMENT

CROSS REFERENCE TO RELATED APPLICATIONS

This application is US National Stage Entry of international patent application no. PCT/EP2008/055733, filed May 9, 2008 designating the United States of America, the entire disclosure of which is incorporated herein by reference. Priority is claimed based on Federal Republic of Germany patent application no. 20 2007 006 962.6, filed May 11, 2007.

TECHNICAL FIELD

The invention concerns a compact filter element, in particular of an air filter for motor vehicles, comprising the features according to the preamble of claim 1.

PRIOR ART

EP 1 159 052 B1 discloses a compact filter element of the aforementioned kind that is provided for exchangeable use in a filter housing. The compact filter element comprises a filter body as well as a seal that is arranged in the area of an end face side of the filter body and comprises a sealing section. The sealing section is provided for sealing contact on a housing wall of the filter housing in the direction of width. The sealing section projects in the direction of the longitudinal axis past an end face of the filter body. In this way, the seal requires relative to the filter body no additional space in the radial or width direction. While maintaining the compact size, almost the entire cross-section of the filter housing can be filled out by means of the filter element and therefore utilized for filtration.

The arrangement of the sealing section projecting past the end face is subjected in the mounted state to forces that result from the sealing contact of the seal on the housing wall and act inwardly toward the longitudinal axis in the direction of width. For taking up these forces, a circumferential frame is provided whose free circumferential edge is enclosed by a sealing element with U-shaped cross-section. The external part of the U-shaped cross-section in the direction of width acts as a seal. The attachment on the support frame is realized together with the cross-sectional area that is inwardly positioned relative to the direction of width. The section of the U-shaped sealing cross-section that is inwardly positioned in the direction of width does not contribute to the sealing function and moreover reduces the free flow cross-section of the compact filter element. Manufacture and assembly are complex.

The invention has the object to further develop a compact filter element of the aforementioned kind such that for a given size the filtration performance is improved and the manufacturing expenditure is reduced.

SUMMARY OF THE INVENTION

A compact filter element is proposed in which the sealing section has a circumferentially extending support wall and at least one sealing lip that is integrally and monolithically formed on the support wall externally in the direction of width wherein the support wall and the sealing lip are comprised of a rubber-elastic material. The invention is based on the realization that the sealing section as a whole, despite its configuration with projecting length in the direction of the longitudinal axis, can be manufactured of an elastic material without losing in the direction of width the pressing force against the housing wall that is required for achieving the desired sealing action. In spite of being embodied from rubber-elastic material, the circumferentially extending support wall generates a satisfactory support action paired with an elasticity that is required for achieving the sealing action. The sealing lip that is integrally formed on the exterior side produces a good sealing action without generating pressing forces in the direction of width that are too high. As a result of the monolithic configuration fastening means that in the direction of width are inwardly positioned are not required anymore. The free flow cross-section is not impaired by the sealing section embodied according to the present invention or is impaired only insignificantly. Manufacturing expenditure and costs are reduced.

In an advantageous embodiment a total of three circumferentially extending sealing lips are arranged on the sealing section. They supplement one another with respect to their sealing action so that the individual sealing lips can be designed to be appropriately elastic. The pressing force providing the sealing action is distributed uniformly across the support wall so that, as a result, its elastic deformation is minimal despite its rubber-elastic material.

The at least one sealing lip is slanted expediently in opposite direction relative to a mounting direction of the compact filter element. This facilitates insertion into a correlated housing part. In particular in connection with a configuration in which the end face side of the filter body with the seal is correlated with a clean side of the filter body, the sealing action is further improved: the pressure difference that is produced in operation between the clean side and the raw side has the result that the slanted sealing lips as a result of the existing pressure difference are forced against the housing wall of the filter housing.

In a preferred embodiment, the support wall has on its inner surface reinforcement ribs each having a plane extending parallel to the longitudinal axis of the compact filter element. The material-based elasticity of the support wall is reduced for ensuring the pressing force for the sealing action without the free flow cross-section of the compact filter element being impaired significantly.

For producing the desired support action, it may be sufficient that the reinforcement ribs project freely past the inner surface of the support wall. Solely by means of this, the bending stiffness of the support wall relative to its cross-section is significantly increased. In an expedient further embodiment, the reinforcement ribs additionally rest on the end face of the filter body. In this way, the support action is further improved. The tendency of the support wall to tilt inwardly when loaded in the direction of width, is reduced. Moreover, the reinforcement ribs act as a mounting aid. When mounting the seal on the filter body, the reinforcement ribs that rest against the end face act as a stop.

It may be expedient to configure the reinforcement ribs as separate individual parts. In a preferred embodiment, the reinforcement ribs are formed integrally and monolithically on the support wall. With a reduced manufacturing expenditure a satisfactory stiffness can be achieved. Moreover, the rubber-elastic embodiment of the reinforcement ribs prevents a local overload of the pressure-sensitive filter body.

In an advantageous further embodiment, the seal has a fastening section that is monolithically and integrally formed with the sealing section with which the seal is attached to an external surface of the filter body wherein at least one further sealing rib is provided that is integrally and monolithically formed on the fastening section on the exterior side in the direction of width. As a whole, with a single processing step a unitary and monolithic seal is formed that combines within all fastening and sealing functions. The additionally formed further sealing lip serves for centering the filter body in the filter housing. In a two-part configuration of the filter housing, the additional sealing lip produces a sealing action, for example, relative to the housing base body while the sealing lips described above cause a sealing action relative to the housing lid. A complex sealing configuration of the housing lid relative to the housing base body is not required.

BRIEF DESCRIPTION OF THE DRAWINGS

One embodiment of the invention will be explained in more detail in the following with the aid of the drawing. The only FIGURE shows in a longitudinal section illustration an air filter with a compact air filter element according to the present invention and a seal arranged at the end face.

EMBODIMENT OF THE INVENTION

The only FIGURE shows a longitudinal section illustration of an air filter for motor vehicles with a compact filter element 1 in accordance with the present invention. Instead of the motor vehicle intake air filter that is shown as an example such an air filter can also be expedient for other applications.

The compact filter element 1 has a coiled filter body 3 comprised of filter paper. Onto a flat filter web a corrugated filter web is applied and, for forming the filter body 3 they are wound together to form the coiled body. The alternating layering of flat and corrugated filter webs that is produced in this way forms gas passages 28, 29. Alternatingly adjacently positioned intake-side gas passages 28 and outlet-side gas passages 29 are closed off with plugs 30, 31. The compact filter element 1 has a raw side 22 and a clean side 23. The intake-side gas passages 28 are closed off at their end correlated with the clean side 23 with plugs 30 while the outlet-side gas passages 29 at their ends correlated with the raw side 22 are closed by plugs 31.

In operation, the compact filter element 1 is mounted in a filter housing 2 and is flown through from the raw side 22 to the clean side 23 in the flow direction 21 parallel to a longitudinal axis 7 of the compact filter element 1. In accordance with arrows 33 the gas to be filtered flows from the raw side 22 into the gas passages 28 at the intake side. As a result of the backing-up action at the plugs 30 the gas flow passes through the filter walls 32 of the gas passages 28, 29 formed of filter paper and enters the gas passages 29 at the outlet side. The thus filtered gas flow then flows through the gas passages 29 at the outlet side in the flow direction 21 to the clean side 23.

Instead of the afore described coiled body, a filter body 3 can also be formed of honeycomb-like expanded layers of filter paper. Instead of the plugs 30, 31 it can also be expedient to close off the gas passages 28, 29 by crimping the filter paper.

The compact filter element 1 is provided for exchangeable use in the filter housing 2. For this purpose, the filter housing 2 comprises a base body 20 and a detachable lid 19 that is attached thereto by forming a joint 34. The plane of the joint 34 is positioned perpendicularly to the longitudinal axis of the compact filter element 1 and of the housing 2. After detaching the lid 19 from the base body 20 the compact filter element 1 can be removed and replaced by a new one.

Relative to the longitudinal axis 7 the filter body 3 has an end face side 5 facing the clean side 23 and an end face side 27 that is correlated with the raw side 22. In the area of the end face side 5 a circumferentially extending seal 4 is arranged on the filter body 3. It comprises a circumferentially extending fastening section 24 with which the seal is attached to an exterior surface 11 of the filter body 3. In the illustrated embodiment, for this purpose the fastening section 24 is glued to the external surface 11. Other fastening means can also be expedient. On the fastening section 24 a circumferentially extending sealing lip 25 is formed that, as a result of its elastic properties in a direction of width 10 perpendicular to the longitudinal axis 7 is resting circumferentially and sealingly against an inner wall of the base body 20. Depending on the configuration of the inner wall of the base body 20, by means of the sealing lip 25 a locking function can also be realized by means of which the compact filter element 1 is secured in its relative position to the base body 20 of the filter housing 2. On the end face side 27 correlated with the raw side 22 a further sealing ring 26 is provided that circumferentially surrounds the exterior surface 11 and in the mounted state of the compact filter element 1 rests in the direction of width 10 against the inner surface of the base member 20 of the filter housing 2.

With the exception of the fastening section 24, the further cross-sectional sections of the circumferential seal 4 project in the direction of the longitudinal axis 7 past an end face 12 of the filter body 3 toward the clean side 23. The sections that extend past the end face 12 include a transition section 13 and a sealing section 8. The sealing section 8 has a circumferential support wall 9 that relative to the fastening section 24 in the direction of width 10 is recessed inwardly toward to the longitudinal axis 7. In this connection, the substantially rectangular cross-section of the support wall 9 is substantially parallel to the longitudinal axis 7. The fastening section 24 passes by means of the transition section 13 that is slanted inwardly toward the longitudinal axis 7 into the support wall 9. A circumferentially extending inner surface 15 of the support wall 9 is parallel or coaxial to the longitudinal axis 7. An inner surface 14 of the transition section 13 tapers approximately conically, beginning at the external surface 11 of the filter body 3, at a slant inwardly toward the longitudinal axis 7 until it adjoins the inner surface 15 of the support wall 9. The extension of the inner surfaces 14, 15 ensures a proper flow guiding action of the gas that exits from the filter body 3 also within the outer edge area.

In the direction of width 10 at least one sealing lip 17 is formed integrally and monolithically on the exterior of the support wall 9. In the illustrated embodiment, a total of three circumferential sealing lips 17 are arranged on the sealing section 8 and, in a cascade-like fashion, are spaced from one another in the direction of the longitudinal axis 7. The sealing section 8 in the mounted state rests with its sealing lips 17 in the direction of width 10 on a housing wall 6 of the filter housing 2. The housing wall 6 may be correlated with the base body 20. In the illustrated embodiment, the housing wall 6 is part of a lid 19. All three sealing lips 17 are resting seal-tightly on the inner side. In combination with the additional sealing lip 25 a sealing action of the compact filter element 1 relative to the base body 20 as well as relative to the lid 19 is ensured so that an additional sealing means between both housing parts in the area of its joint 34 is not required.

Relative to the housing part with the housing wall 6 that has correlated therewith the sealing lips 17 a mounting direction of the compact filter element 1 is indicated by arrow 18. When positioning the lid 19 on the base body 20 with the compact filter element 1 inserted therein the sealing section 8 slides in the mounting direction 18 into the lid 19. The sealing lips 17 are slanted in a direction opposite to the mounting direction 18. In the released state, their outer edges project in the direction of width 10 past the housing wall 6. When pushing on the lid 19 the slant of the sealing lips 17 is increased wherein an elastic pretensioning force in the direction of width 10 for contact against the housing wall 6 is generated. In operation of the illustrated filter, a pressure difference between the raw side 22 and the clean side 23 is produced and, accordingly, at the raw side 22 a reduced pressure in comparison to the clean side 23 is present. This difference can act so as to assist the pressing force of the slantedly positioned sealing lips 17.

The support wall 9 is provided on its inner surface 15 with integrally formed projecting ribs 16. The areal flat reinforcement ribs 16 extend in the direction of width 10 and parallel to the longitudinal axis 7 so that their respective plane is positioned parallel to the longitudinal axis 7. In this way, an unimpaired outflow of the gas passing through the filter body 3 is possible. At the same time, the bending stiffness of the cross-section of the support wall 9 is increased. As an additional advantageous option it is illustrated that the reinforcement ribs 16 rest on the end face 12 of the filter body 3.

The seal 4 as a whole, including the sealing section 8 with the support wall 9, the sealing lips 17 and the reinforcement ribs 16, the transition section 13 and the fastening section 24 with the additional sealing lip 25, is unitarily and monolithically manufactured of a rubber-elastic material.

The invention claimed is:

1. Compact filter element (1) for exchangeable use in a filter housing (2), comprising:
   a filter body (3) with a longitudinal axis (7)
   as well as at least one seal (4) arranged in the area of an end face side (5) of the filter body (3) and provided with a sealing section (8),
   which sealing section in a direction of width (10) is provided for a sealing contact on a housing wall (6) of the filter housing (2),
   wherein the sealing section (8) projects past an end face (12) of the filter body (3) in the direction of the longitudinal axis (7),
   wherein the sealing section (8) has a circumferentially extending support wall (9) and at least one sealing lip (17) integrally and monolithically formed on the side of the support wall (9) that is external in the direction of width (10),
   wherein the support wall (9) and the at least one sealing lip (17) are comprised of a rubber-elastic material,
   wherein the support wall (9) has on its inner surface (15) reinforcement ribs (16) each having a plane that is positioned parallel to the longitudinal axis (7),
   wherein the at least one sealing lip (17) is integrally and monolithically formed on the support wall extending externally in direction of width, the support wall (9) and the at least one sealing lip (17) form a one-piece monolithic elastic component of said rubber-elastic material.

2. Compact filter element according to claim 1, wherein a total of three circumferentially extending sealing lips (17) are arranged on the sealing section (8).

3. The compact filter element according to claim 2, wherein the sealing lips (17) are slanted in a direction opposite to a mounting direction (18) of the compact filter element (1);
   wherein the reinforcement ribs (16) rest on the end face (12) of the filter body (3);
   wherein the seal (4) comprises a fastening section (24) that is integrally and monolithically formed with the sealing section (8) with which the seal (4) is attached on an exterior surface (11) of the filter body (3);
   wherein at least one further sealing lip (17) is provided that in the direction of width (10) is positioned externally and is integrally and monolithically formed on the fastening section (24); and
   wherein the end face side (5) of the filter body (3) with the seal (4) is correlated with a clean side (23) of the filter body (3).

4. Compact filter element according to claim 1, wherein the at least one sealing lip (17) is slanted in a direction opposite to a mounting direction (18) of the compact filter element (1).

5. Compact filter element according to claim 1, wherein the reinforcement ribs (16) rest on the end face (12) of the filter body (3).

6. Compact filter element according to claim 1, wherein the reinforcement ribs (16) are formed integrally and monolithically on the support wall (9) such that the reinforcement ribs (16), the support wall (9) and the at least one sealing lip (17) form a one-piece monolithic elastic component of said rubber-elastic material.

7. Compact filter element according to claim 1, wherein the seal (4) comprises a fastening section (24) that is integrally and monolithically formed with the sealing section (8) with which the seal (4) is attached on an exterior surface (11) of the filter body (3),
   wherein at least one further sealing lip (17) is provided that in the direction of width (10) is positioned externally and is integrally and monolithically formed on the fastening section (24).

8. Compact filter element according to claim 1, wherein the end face side (5) of the filter body (3) with the seal (4) is correlated with a clean side (23) of the filter body (3).

* * * * *